US009623698B2

(12) United States Patent
Lucas-Woodley et al.

(10) Patent No.: US 9,623,698 B2
(45) Date of Patent: Apr. 18, 2017

(54) BOOK FOR AUGMENTED REALITY APPLICATIONS

(71) Applicant: Sony Computer Entertainment Europe Limited, London (GB)

(72) Inventors: Thomas Lucas-Woodley, London (GB); Nicholas Andrew Lord, London (GB); William Oliver Sykes, London (GB); Adrien Bain, London (GB)

(73) Assignee: Sony Computer Entertainment Europe Limited (GB)

( * ) Notice: Subject to any disclaimer, the term of this patent is extended or adjusted under 35 U.S.C. 154(b) by 0 days.

(21) Appl. No.: 13/760,844

(22) Filed: Feb. 6, 2013

(65) Prior Publication Data
US 2013/0207373 A1     Aug. 15, 2013

(30) Foreign Application Priority Data

Feb. 13, 2012 (GB) .................................. 1202389.1
May 22, 2012 (GB) .................................. 1209025.4

(51) Int. Cl.
*B42D 1/00* (2006.01)
*B42D 5/00* (2006.01)
(Continued)

(52) U.S. Cl.
CPC ............... *B42D 1/00* (2013.01); *A63F 13/02* (2013.01); *A63F 13/10* (2013.01);
(Continued)

(58) Field of Classification Search
CPC . B42D 1/00; B42D 5/00; B42D 15/00; B42D 15/10; G06K 7/00; G06K 7/10;
(Continued)

(56) References Cited

U.S. PATENT DOCUMENTS 4,958,855 A * 9/1990 Shipp ........................ B42F 7/06
                                                                281/45
6,585,163 B1 * 7/2003 Meunier et al. . G06K 19/06028
                                                                235/487
(Continued)

FOREIGN PATENT DOCUMENTS

EP         2426641 A1    3/2012
GB    2012049795 A1      4/2012
(Continued)

OTHER PUBLICATIONS

Search Report for Great Britain application No. GB1202389.1 dated Jun. 13, 2012.
(Continued)

*Primary Examiner* — David Bryant
*Assistant Examiner* — Justin V Lewis
(74) *Attorney, Agent, or Firm* — Lerner, David, Littenberg, Krumholz & Mentlik, LLP

(57) ABSTRACT

A book for use with augmented reality applications includes a plurality of stiff leaves, each side of which forms a page of the book. On each page a respective fiduciary marker is positioned substantially in the middle of the page. Each fiduciary marker comprises a different respective asymmetric pattern capable of indicating the scale and orientation of the book to an augmented reality application and of indicating the respective page, and a non-alphanumeric pattern positioned closer to an outside edge of the page of the book than the fiduciary marker. The non-alphanumeric pattern on a respective page is capable of indicating at least the opposing page pair comprising the respective page on which the non-alphanumeric pattern is positioned, when used in conjunction with the scale and orientation of the book as indicated by a fiduciary marker on a different page to that of the respective non-alphanumeric pattern.

16 Claims, 8 Drawing Sheets

(51) Int. Cl.
  B42D 15/00      (2006.01)
  B42D 15/10      (2006.01)
  G06K 5/04       (2006.01)
  G06K 7/10       (2006.01)
  G06K 9/32       (2006.01)
  G06K 9/18       (2006.01)
  G06K 9/80       (2006.01)
  G06T 19/00      (2011.01)
  G06T 11/00      (2006.01)
  G06K 9/00       (2006.01)
  A63F 13/98      (2014.01)
  A63F 13/40      (2014.01)

(52) U.S. Cl.
  CPC ....... *G06K 9/00671* (2013.01); *G06K 9/3208* (2013.01); *G06K 9/3216* (2013.01); *G06T 11/00* (2013.01); *G06T 19/006* (2013.01); *A63F 2300/1093* (2013.01); *A63F 2300/69* (2013.01); *A63F 2300/8082* (2013.01); *G06K 2009/3225* (2013.01)

(58) Field of Classification Search
  CPC .. G06K 5/04; G06K 9/18; G06K 9/36; G06K 9/80; G06K 9/3208; G06K 9/00671; G06K 9/3216; G06K 9/00442; G06K 2009/3225; G06T 11/00; G06T 19/006; A63F 13/10; A63F 13/02
  USPC .......... 281/3.1, 15.1, 38; 283/56, 67, 72, 93, 283/901; 235/439, 462.01, 462.08–462.1
  See application file for complete search history.

(56) References Cited

U.S. PATENT DOCUMENTS

| | | | |
|---|---|---|---|
| 2001/0044858 A1 | 11/2001 | Rekimoto | |
| 2008/0194323 A1 | 8/2008 | Merkli et al. | |
| 2008/0200153 A1* | 8/2008 | Fitzpatrick et al. | 455/414.1 |
| 2008/0296390 A1 | 12/2008 | Dudek | |
| 2009/0206591 A1* | 8/2009 | Van Woerden | B42D 1/009 281/38 |
| 2010/0230946 A1* | 9/2010 | Kanda | 283/85 |
| 2011/0186625 A1* | 8/2011 | Mangione-Smith | C07K 14/70503 235/375 |
| 2011/0280445 A1 | 11/2011 | Lieberknecht et al. | |
| 2011/0316266 A1* | 12/2011 | Miranti | B42F 7/06 281/38 |
| 2012/0050326 A1 | 3/2012 | Tanaka | |
| 2013/0278635 A1 | 10/2013 | Maggiore | |

FOREIGN PATENT DOCUMENTS

| | | | | |
|---|---|---|---|---|
| KR | 20110091126 A | 8/2011 | | |
| KR | 20120035321 A | 4/2012 | | |
| WO | 2004012141 A2 | 2/2004 | | |
| WO | WO 2006005149 A2 * | 1/2006 | | B41M 3/14 |

OTHER PUBLICATIONS

Examination Report for Great Britain application No. GB1202389.1 dated Jun. 14, 2012.
Grasset R et al. ,"The design of a mixed-reality book: Is it still a real book?", 7th IEEE/ACM International Symposium on Mixed and Augmented Reality (ISMAR), 2008, IEEE, Piscataway, NJ, USA, Sep. 15, 2008, pp. 99-102.
Billinghurst, M et al., "The MagicBook: a transitional AR interface", Computers and Graphics, Elsevier, GB, vol. 25, No. 5, Oct. 1, 2001. pp. 745-753.
Examination Report for Great Britain application No. GB1209025.4 dated Sep. 19, 2012.
Search Report for Great Britain application No. GB1209025.14 dated Sep. 19, 2012.
Feng Zhou et al: "Trends in augmented reality tracking, interaction and display: A review of ten years of ISMAR", Mixed and Augmented Reality, 2008, ISMAR 2008, 7th IEEE/ACM International Symposium on, IEEE, Piscataway, NJ, USA, Sep. 15, 2008, pp. 193-202, XP031344009.
Grasset R et al.: "The design of a mixed-reality book: Is it still a real booK?", Mixed and Augmented Reality, 2008. ISMAR 2008. 7th IEEE/ACM International Symposium on, IEEE, Piscataway, NJ, USA, Sep. 15, 2008, pp. 99-102, XP031343982.
Hyun S Yang et al: "Hybrid Visual Tracking for Augmented Books", Sep. 25, 2008, Entertainment Computing—ICEC 2008; [Lecture Notes in Computer Science], Springer Berlin Heidelberg, Berlin. Heidelberg, pp. 161-166, XP019109652.
Kyusurig Cho et al: "A Realistic E-Learning System based on Mixed Reality", Proc 13th Intl Conference on Virtual Systems and Multimedia, Sep. 23, 2007, pp. 57-84, XP055081387.
Partial European Search report for Application No. 13152016 dated Oct. 18, 2013.

* cited by examiner

US 9,623,698 B2

1

BOOK FOR AUGMENTED REALITY APPLICATIONS

CROSS REFERENCE TO RELATED APPLICATIONS

The present application claims the benefit of and priority to GB Application No. 1202389.1, filed Feb. 13, 2012, and GB Application No. 1209025.4, filed May 22, 2012, the entire disclosures of which are incorporated by reference herein.

BACKGROUND OF THE INVENTION

Field of the Invention

The present invention relates to a book for augmented reality applications.

Description of the Prior Art

Augmented reality refers to the process of capturing a video image of an environment, and augmenting that video image with computer graphic elements (typically depicting virtual objects such as game characters that are to appear as if part of the environment). To provide a convincing augmentation, it is desirable for these computer graphic elements to be displayed in a manner consistent with the environment, particularly in terms of scale, range of motion, and viewing angle. Thus for example if the video image of the environment (referred to herein also as the 'scene') depicts a floor or table-top from a particular view point, it is desirable that the computer graphic elements are scaled and oriented so as to appear to properly rest on that surface, and to move on it in a physically consistent fashion.

However, the determination of the scale and orientation of elements of the scene, and hence of the virtual objects that are superposed on them, is a non-trivial task.

Referring now to FIG. 1, consequently in a typical augmented reality application a so-called fiduciary marker 1010 of a known size is included in the environment to be captured by the video camera, in order to provide an easily detectable and known feature whose scale and orientation can be more readily estimated.

Such fiduciary markers are typically high-contrast (e.g. black and white) so providing scope for pattern recognition in even relatively poor image capture conditions (e.g. with low resolution image capture, poor lighting, and the like). The patterns themselves usually comprise a thick quadrilateral boundary containing an asymmetric distribution of blocks or tiles, which enable a disambiguation of the orientation of the marker. Consequently the recognition process typically provides an estimation of the position (x and y axis position in the image) and rotation (by virtue of the marker's asymmetry) of the fiduciary marker within the captured video image.

Optionally in addition the distance of the fiduciary marker (its z-axis position) from the video camera may be estimated by comparing the size of the fiduciary marker in the captured image with a known size of the fiduciary marker (e.g. its size in pixels at a distance of 1 meter); in other words, its scale.

Similarly, optionally a tilt of the fiduciary marker (i.e. its deviation from the x-y plane in the z direction) may be estimated by comparing the aspect ratio of the fiduciary marker in the captured image with the known aspect ratio of the fiduciary marker, and/or using other techniques such as detecting foreshortening (where a rectangular shape appears trapezoidal) or other distortions of the fiduciary marker in the captured video image.

2

The generated graphical overlay typically comprises a virtual graphics element that can then be superposed over the fiduciary marker, with the estimated position, rotation distance and tilt of the fiduciary marker used to modify the virtual graphics element as applicable.

The augmented image is then output to a display.

The subjective effect of this process is that the output video image comprises a graphical element (for example a monster or a castle) in place of the fiduciary marker, typically replicating the estimated position, rotation, distance and tilt of the fiduciary marker and hence also the surface of the environment upon which the marker has been placed.

However, it will be appreciated that in such augmented reality systems the user's suspension of disbelief, which makes them complicit in the illusion that the graphical overlay is part of the captured scene, is at least in part dependent upon the reliability with which the graphical overlay matches or interacts with some real-world aspect of the scene. This reliability is frequently dependent upon estimates of the position and orientation of the fiduciary marker within the scene.

Thus it is desirable to reduce the occasions upon which such estimates cannot be reliably made, and to improve the consistency of estimates that are made.

SUMMARY OF THE INVENTION

In a first aspect, a book for use with augmented reality applications is provided according to claim 1.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

A book for augmented reality applications is disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
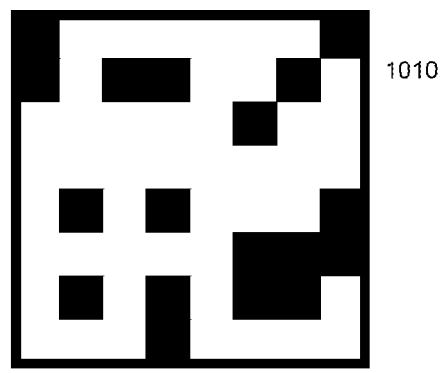
FIG. 1 is a schematic diagram of a fiduciary marker according to an embodiment of the present invention.
Figure 2A:
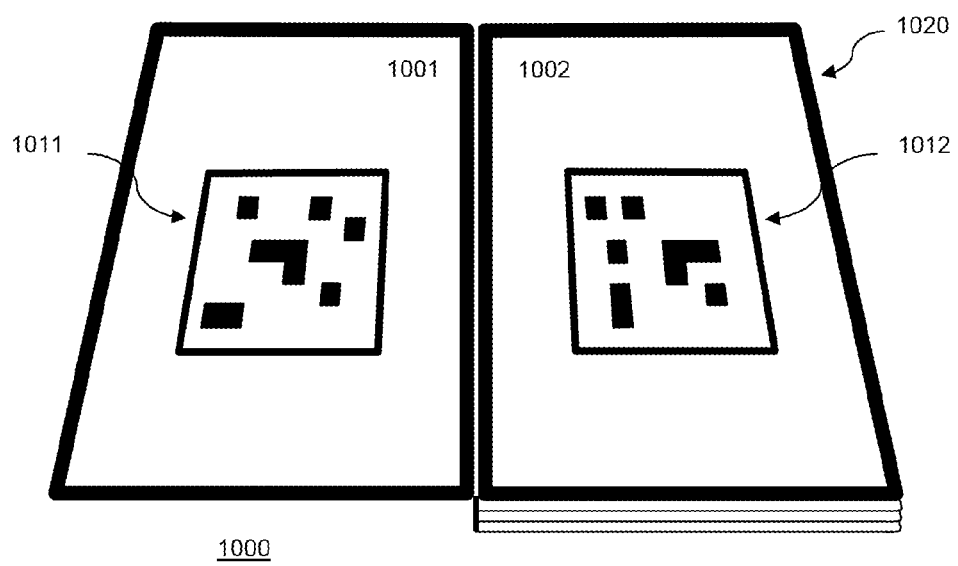
FIG. 2A is a schematic diagram of a book according to an embodiment of the present invention.
Figure 2B:
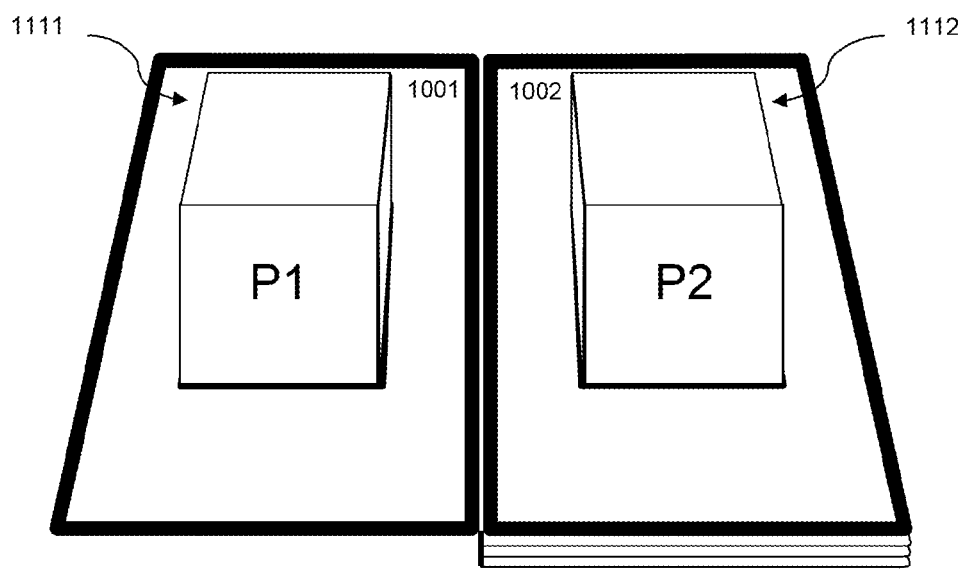
FIG. 2B is a schematic diagram of an image of a book overlaid with computer graphic augmentations according to an embodiment of the present invention.

Referring now to FIGS. 2A and 2B, in an embodiment of the present invention a book 1000 has a plurality of rigid, turnable leaves (a so-called 'board book'), and comprises fiduciary markers 1011, 1012 on each page 1001, 1002, as shown in FIG. 2A. A leaf will be understood to be a single turnable sheet or panel of a book and typically comprises a page on each side. FIGS. 2A and 2B show, by way of example, pages 1 and 2 (respectively labelled 1001 and 1002). Optionally the inside front and/or back covers of the book may also act as pages and comprise fiduciary markings. Hence in this example, page 1 may in fact be the inside front cover. Similarly, optionally the outside front and/or back covers may comprise fiduciary markings. In addition, optionally each page is edged with a high contrast marking 1020 at the outside edges to facilitate detection of the extent of the page.

An entertainment device coupled to a video camera can capture an image of the book and use known techniques to detect the fiduciary markings on each visible page and hence locate those pages of the book. Given this information, then as illustrated in FIG. 2B an entertainment device can augment the captured video image of the book with pop-up virtual graphic elements 1111, 1112 corresponding to placement, scale and orientation of the fiduciary markings 1011, 1012 on the visible pages, and output the augmented video image for display. In this way the displayed version of the book becomes a 'magic' pop-up book in which the pages can come to life.

Figure 3A:
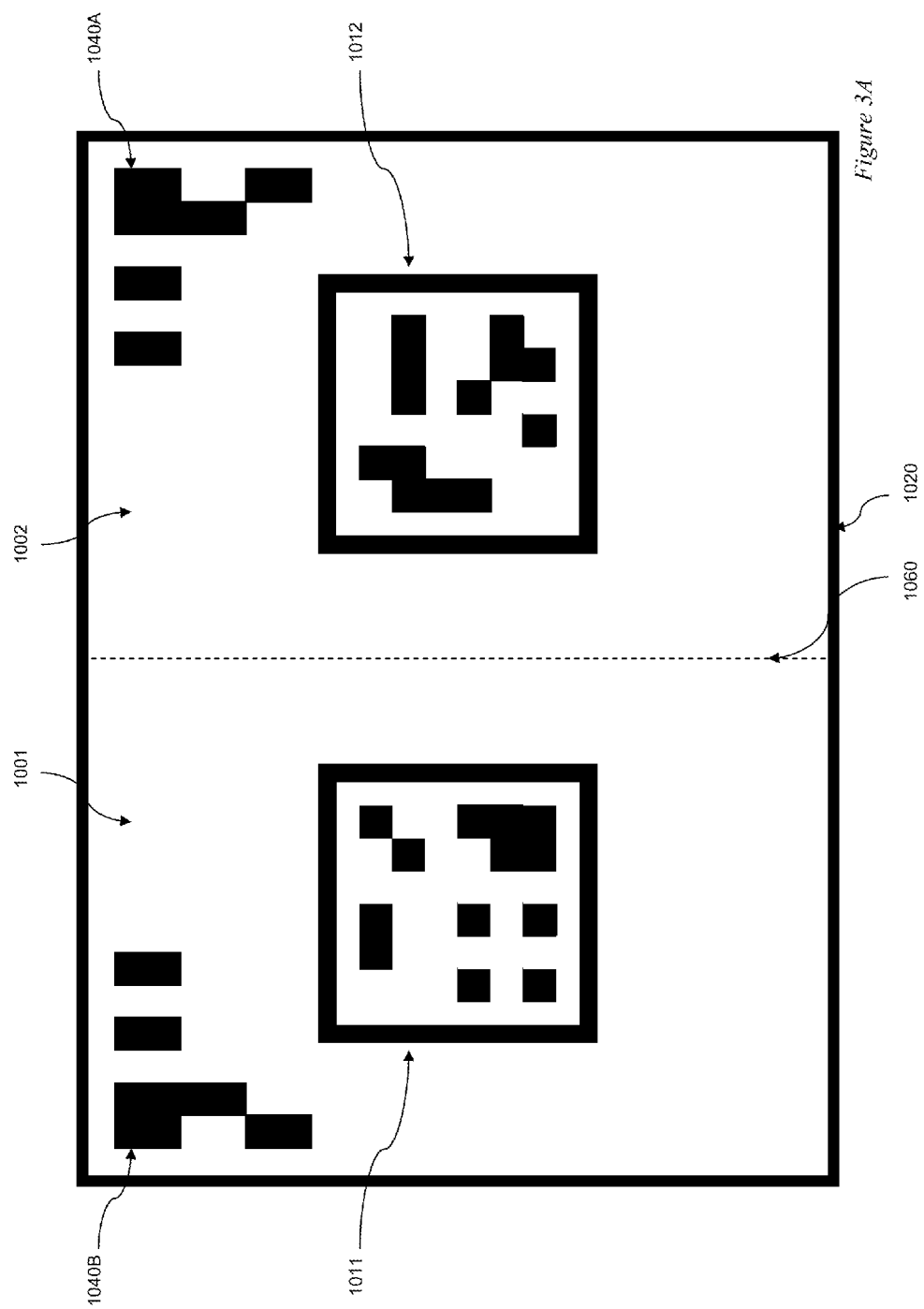
FIG. 3A is a schematic diagram of a book according to an embodiment of the present invention.

Turning now to FIG. 3A, in an embodiment of the present invention each page (1001, 1002, etc.) comprises at least one respective fiduciary marker (1011, 1012) positioned substantially in the middle of the page. The middle may be considered to be an area of the page a predetermined distance from the outside edges of the page, the predetermined distance lying for example in the range 4 centimeters to 10 centimeters for a typical A4 size book. The purpose of this spacing is to reduce the scope for fingers or thumbs to occlude some or all of the fiduciary marker when holding the book in normal use; hence more generally the predetermined distance may be the average length of the thumb of a user amongst the target audience for the book. As result, if it is desired to maximise the size of the fiduciary marker within this middle area, then assuming that the marker is either square or a quadrilateral with an aspect ratio similar to that of the pages, it is preferable to orient it substantially in alignment with the edges of the page.

The fiduciary markers may therefore be positioned exactly centrally with respect to a page, or, in an embodiment of the present invention are offset laterally toward the spine of the book 1060 (which lays between opposing pages when the book is fully open and flat). In this case the offset may typically be in the order of 1 to 5 cm, though other offsets may be envisaged depending on the size of the book.

Each fiduciary marker on these pages comprises a different respective asymmetric pattern capable firstly of indicating the scale and orientation of the book to an augmented reality application, as described above, and secondly of indicating the respective page (i.e. which page of the book it is). It will be appreciated that an augmented reality application operable with the book will hold reference or template copies of each fiduciary marker, and that each marker will be associated with a particular page of the book. Consequently identification of a marker also identifies the page it is printed on or attached to.

In addition, on each page a non-alphanumeric pattern (1040A, 1040B) is positioned closer to an outside edge of the page of the book than the fiduciary marker. Typically, this non-alphanumeric pattern is positioned between the fiduciary marker and the edge of the page that, in normal use, is furthest from the user of the book. This edge is also closest to the video camera for the most typical usage of the book, in which the video camera is positioned close to the TV on which the augmented images are to be displayed, and the user is facing the TV. The non-alphanumeric pattern can similarly be positioned between a corner of the fiduciary marker and the corner of the page formed by the further page edge from the user and the lateral outside page edge (the left or right outside page edge, depending on the page), as illustrated in FIG. 3A.

Notably, the non-alphanumeric pattern can thus form an 'L' shape (i.e. follow the outer edge of the book around the corner). In this case the non-alphanumeric pattern is therefore positioned closer to both edges than the fiduciary marker.

This non-alphanumeric pattern is capable in principle of indicating at least the opposing page pair comprising the respective page on which the non-alphanumeric pattern is positioned. An opposing page pair will be understood to be a pair of successive pages facing each other when the book is open and thus potentially viewable at the same time, as distinct to successive pages printed on either side of a single leaf of the book, which cannot be viewed together in this manner. For example, pages 1 (1001) and (1002) of FIG. 3A are an opposing page pair, as are pages 3 (1003) and 4 (1004) of FIG. 4.

Hence in the illustrated example, the non-alphanumeric pattern is unique to the pair of pages 1 and 2 (1001, 1002). Optionally, the non-alphanumeric pattern could be unique to a single page, but this could potentially require a more complex pattern as it doubles the number of unique patterns required.

Notably, unlike the fiduciary marker, the non-alphanumeric pattern is not needed to initially determine the position, scale or orientation of the book, or the page of the book it is found on. As a result the non-alphanumeric pattern can in principle be ambiguous in terms of scale or orientation, as these aspects of the pattern can be resolved with reference to the fiduciary markers in the book.

Notably therefore the non-alphanumeric pattern can be arranged on opposing pages as a mirror image about the spine of the book as shown in FIG. 3A to appear more pleasing to the user, without affecting its functionality.

Hence, each non-alphanumeric pattern is capable of indicating at least the opposing page pair comprising the respective page on which the non-alphanumeric pattern is positioned, when used in conjunction with the scale and orientation of the book as indicated by a fiduciary marker to resolve any scale and orientation ambiguity.

Figure 4:
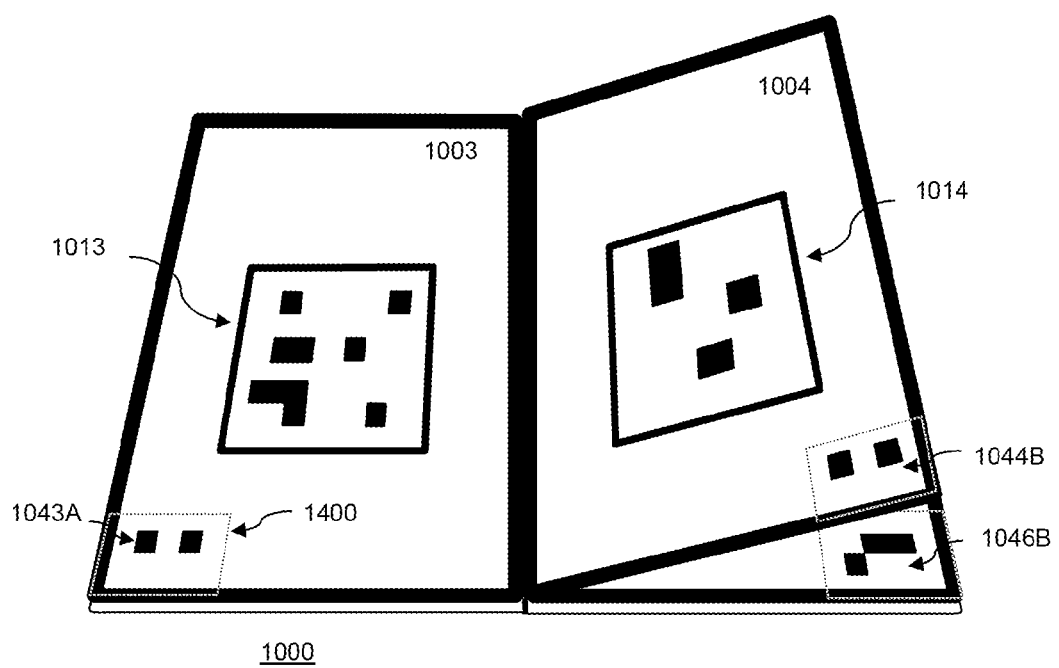
FIG. 4 is a schematic diagram of a book according to an embodiment of the present invention.

Referring now to FIG. 4, this shows a camera-view of the book as the leaves are being turned. Notably because the non-alphanumeric pattern is closer to the edge of the book facing the camera than the Fiduciary marker on the same page, it can be captured by the camera earlier in the process of the page being revealed and thus provide an early indication of what page is to be revealed as the user turns leaves of the book.

In the example of FIG. 4, the book is currently open on pages 3 and 4 (1003, 1004), and the fiduciary markers (1013, 1014) for these pages are visible, as are their respective non-alphanumeric patterns 1043A and 1044B, which in this case are again shown as mirror images of the same pattern for that opposing page pair.

In addition, the non-alphanumeric pattern 1046B, corresponding to pages 5 and 6 of the book, is visible due to the turning of page 4. It will be appreciated that the fiduciary marker on page 6 of the book will not become fully visible until page 4 has turned much further. It is undesirable, however, to leave page 6 blank (unaugmented or generically augmented) until the fiduciary marker on that page can be identified.

However, the non-alphanumeric pattern 1046B can be identified using knowledge of the position, scale and orientation of the book obtained from the visible fiduciary markers on page 3 and (for now) page 4. Thus despite not having access to the fiduciary marker on page 6, and despite the possible rotational ambiguity of the non-alphanumeric pattern, the non-alphanumeric pattern can be used to indicate at least the opposing page pair when used in conjunction with the scale and orientation of the book as indicated by a fiduciary marker on a different, currently visible, page of the book.

Consequently the partially revealed page can be augmented correctly much earlier in the process of turning the pages given knowledge of the position, scale and orientation of the book and an identification of what page is being revealed, which greatly improves the sense of immersion and the suspension of disbelief for the user.

Figure 3B:
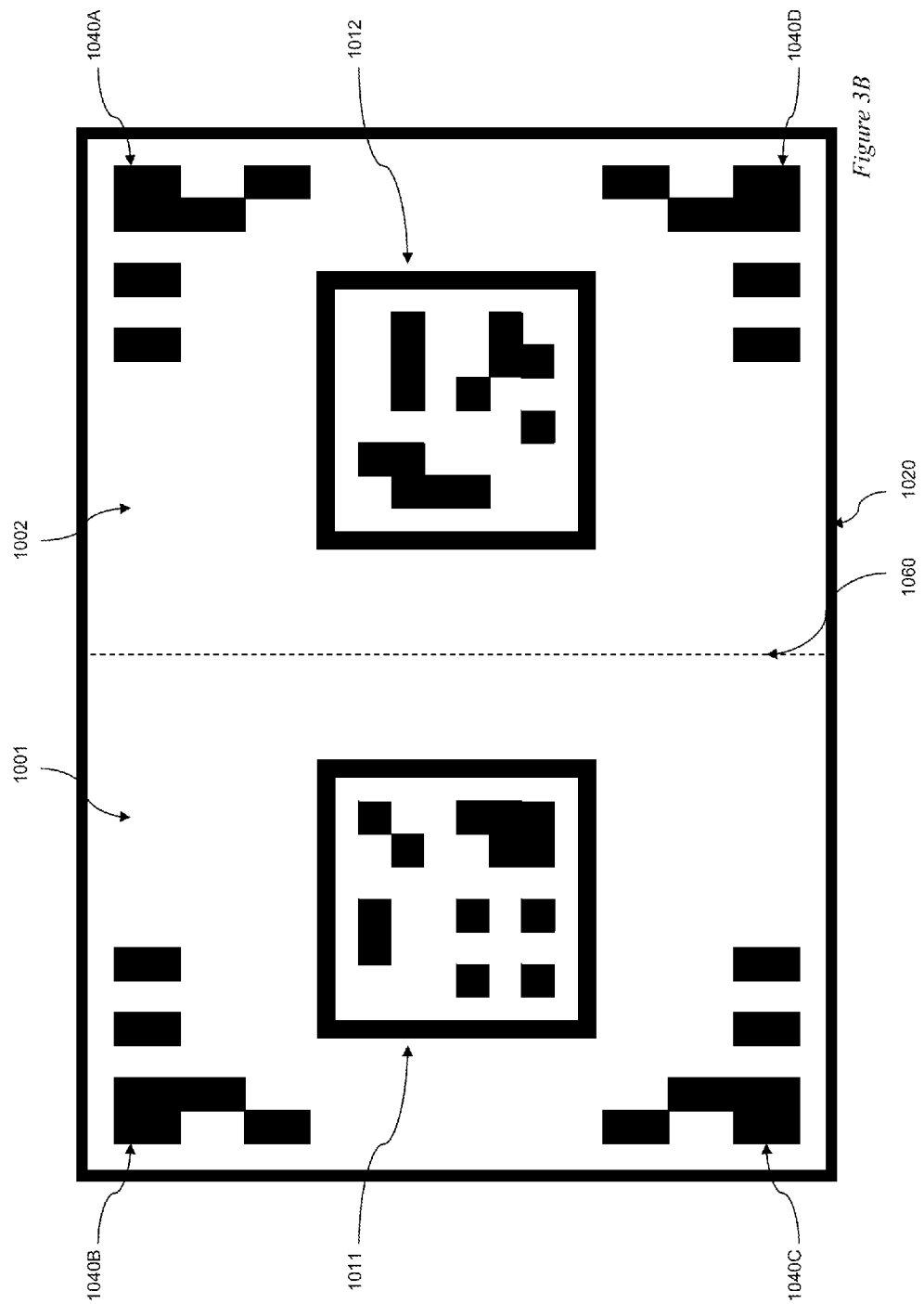
FIG. 3B is a schematic diagram of a book according to an embodiment of the present invention.

Turning now back to FIG. 3B, it will be appreciated that the non-alphanumeric pattern can also be mirrored about a centre line between the two outside edges of the page (i.e. the top and bottom edges, as the left or right edge does not have a corresponding opposite outside edge but instead ends at the spine).

Consequently in an embodiment of the present invention a two-page spread may have four copies of the same non-alphanumeric pattern 1040A-D, each rotated by 90 degrees to another, and having a rotational symmetry about the midpoint of the spine of the book.

This means that if the user of the book holds it upside-down, a copy of the non-alphanumeric pattern will still be visible to the camera for the purpose of early indication of the newly revealed page(s).

In embodiments of the present invention, the non-alphanumeric patterns may each have one or more of the following properties.

The pattern occupies a predetermined area, such as the 'L' shape described above, and may be thought of as a pattern of light and dark tiles within that area. In an embodiment of the present invention, each non-alphanumeric pattern has the same predetermined ratio of light to dark tiles (for example 1:1). This enables a simple validation check of the pattern by an augmented reality application.

Similarly, the pattern may be arranged so that it does not form an unbroken line along its outside edge or edges. This helps to discriminate the pattern from a shadow cast by the page above it as it is turned, as this shadow will have a straight edge.

More generally, the pattern may be arranged to be 'unnatural'; that is to say, being high contrast, containing multiple discontinuities, and/or having significantly different proportions of light and dark in different parts of the pattern. The purpose of this arrangement is to distinguish the pattern from other background patterns that may be in the captured image, such as a swirling carpet pattern, or a regular chequered tablecloth pattern.

Referring again to the patterns as comprising light and dark tiles, the tiles themselves may be elongated in a direction parallel to the spine of the book. Hence for example each tile may extend twice as far vertically (parallel to the spine) as horizontally (transverse to the spine). This improves the recognisability of the pattern at acute angles relative to the camera by partially compensating for the foreshortening affect seen at such angles when viewing the book in the manner shown in FIG. 4.

Figure 5:
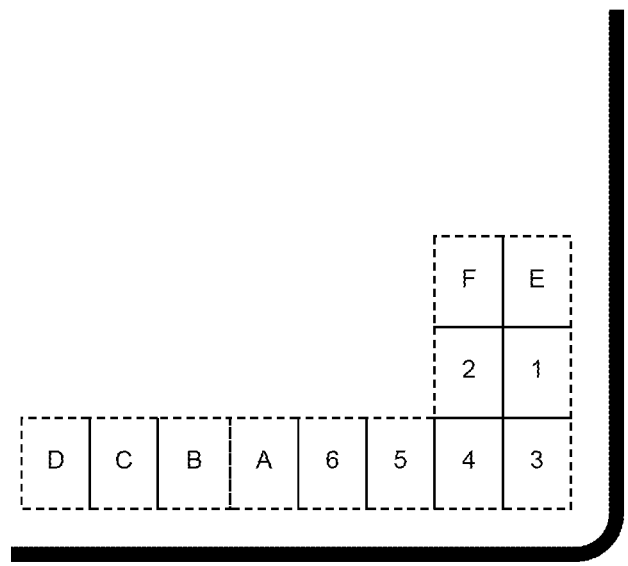
FIG. 5 is a schematic diagram of regions within a non-alphanumeric pattern of a book according to an embodiment of the present invention.

Turning now to FIG. 5, in an embodiment of the present invention each respective non-alphanumeric pattern comprises a sub-region of the pattern. This is illustrated schematically in FIG. 5 where pattern elements 1, 2, 3, 4, 5 and 6 form a sub-region that is functionally distinct from the remaining region(s) denoted by elements A, B, C, D, E and F.

The sub-region of the pattern encodes data indicating the respective page, or the opposing page pair comprising the respective page, on which the respective non-alphanumeric pattern is positioned. Hence in principle in this embodiment only this part of the pattern is required to indicate the page or page pair. Hence in this non limiting example, six bits are used to identify the pages.

Meanwhile, the remaining pattern elements can be used for other purposes, such as providing additional information about the page, or code redundancy, or to provide an early indicator of contrast levels on the new page to assist acquisition of the Fiduciary marker.

As shown in FIG. 5, if the non-alphanumeric pattern occupies an 'L' shaped region of the page between the fiduciary marker and an outer corner of the page, the sub-region of the pattern encoding data indicating the respective page can be located substantially at the corner of the 'L' shaped region.

Referring now back to FIGS. 3A and 3B, in an embodiment of the present invention the outside edges of each page comprise a high contrast border 1020 with respect to the surrounding area of the page. Advantageously this provides a clear demarcation of the extent of the page without having to rely on a contrasting background, such as a differently coloured floor. This can assist the augmented reality application to identify and track pages of the book. In an embodiment of the present invention, the high contrast border is not printed on the inside edge of the page adjacent to the spine.

Figure 3C:
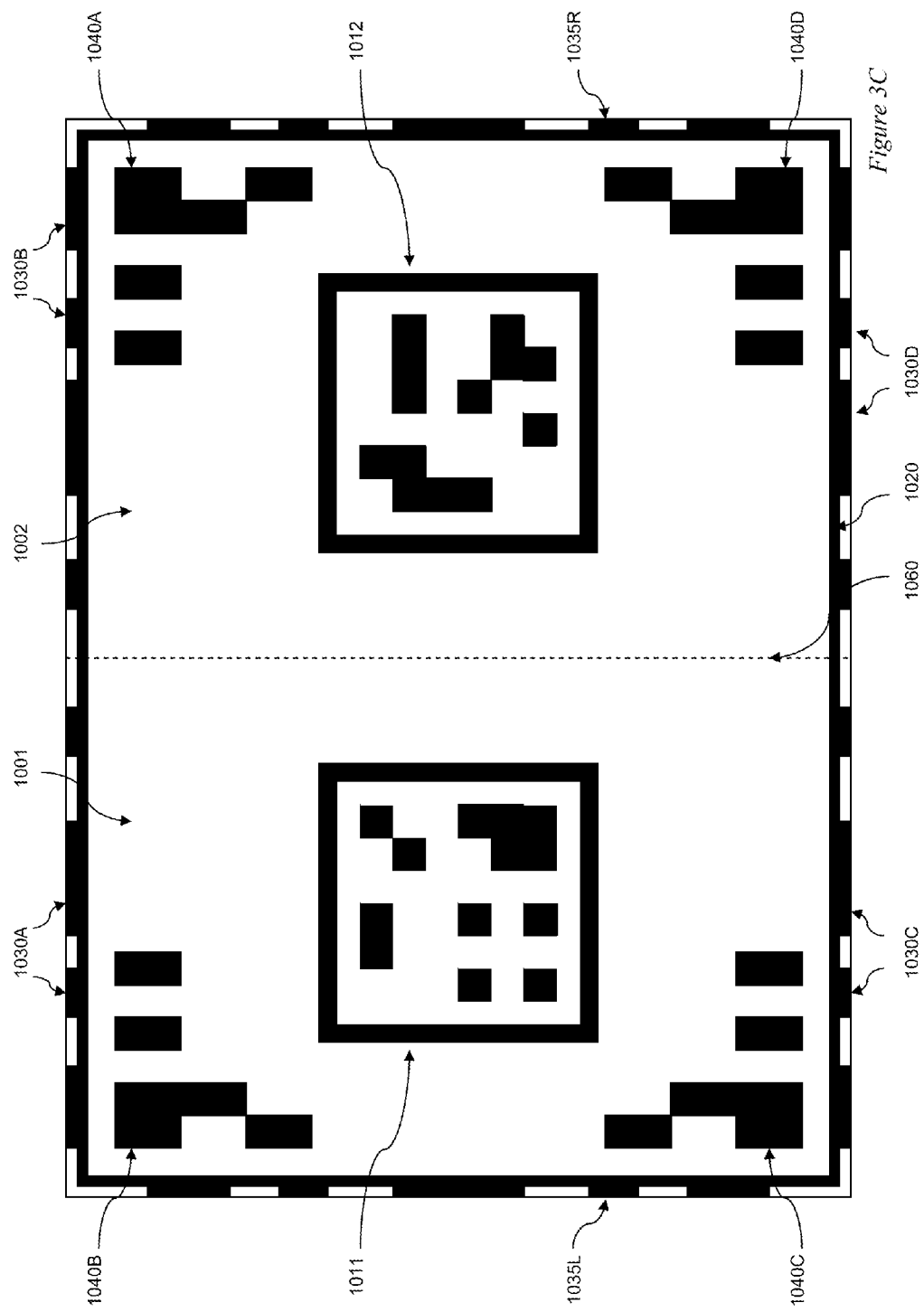
FIG. 3C is a schematic diagram of a book according to an embodiment of the present invention.

Turning now to FIG. 3C, in an embodiment of the present invention the book has a cover having larger dimensions than the leaves of the book, and hence having extremities that extend beyond the outer edges of each page when viewed from above as in FIG. 3C.

In an embodiment of the present invention, the cover comprises a high contrast pattern along at least a first such extremity (1030A). It will be appreciated that the pattern is thus printed on the inside cover at and near to the outer edge of the cover.

As with the non-alphanumeric pattern, the pattern may be mirrored about the spine (and hence appear on the inside front and back covers) and may also be mirrored about a centreline between the top and bottom of the pages, to form four copies of the high contrast pattern (1030A-D).

The pattern may encode information about the book (for example a title number) or may simply be random. A typical high contrast pattern may encode in the order of 6 to 20 bits. The light and dark elements of the pattern may adhere to a regular spacing scheme or have arbitrary spacing.

In addition, a high contrast pattern (1035L,R) may also be positioned along the lateral extremities of the book. This high contrast pattern may be the same as the high contrast pattern mentioned above, or may encode the same information in a different way, or encode different or additional information, or be random.

In any of the above cases, it will be appreciated that the covers have a predetermined thickness. Consequently, in an embodiment of the present invention, the high contrast pattern extends over the edge of the cover and across at least a predetermined proportion of the thickness of the cover, to improve its visibility at very acute angles with respect to the video camera.

In either case, the high-contrast pattern provides a still-earlier indication of the state of the book when a leaf is being turned; it will be appreciated that whilst the non-alphanumeric pattern of a newly revealed page becomes visible before the fiduciary marker on that page, there will still be an earlier phase in the turning of the leaves where even this pattern may not be visible; for example when the angle between the turning leaf and the newly revealed page is in the order of 1 to 15 degrees.

Typically in this case the angle of the turning leaf is determined by analysis up the fiduciary marker and border of the uppermost page on the turning leaf, and little or no information is available about the page being revealed.

In this case, a designer may choose to augment the visible portion of the newly revealed page using a generic graphic or colour scheme consistent with the augmentations used in the book, or may assume that only one leaf is being turned and select the augmentation suitable for the next pair of pages, pending confirmation by the non-alphanumeric pattern and eventually the fiduciary markers of those pages. These approaches may be assisted by generally designing the augmentations to be generic or at least low in detail around the edges of the pages of the book, so that generic augmentations can be discretely replaced with page specific augmentations as the page is revealed.

However, this all assumes that there is a page to be revealed; if the turning of a leaf is detected based upon the distortions of the marks on the uppermost page that is being turned, then there is little or no knowledge of how many pages are being turned, including whether in fact the cover is being turned to close the book. In this latter case, it is undesirable to illustrate a generic page where there is none, only to remove it once it is recognised that the book is closed.

Therefore to enable an augmented reality system to make this distinction, the high contrast pattern around the edge of the inside cover(s) of the book enables a disambiguation between when just leaves of the book being turned and when a cover of the book is lifted from the supporting surface, for example to close the book.

It will also be appreciated that the high contrast pattern acts as a one-dimensional binary pattern that may be used to estimate the resting angles of the covers of the book, and hence also the resting angles of the leaves of the book; hence if the book is laid on a table, the book covers may lie flat, indicating an angle of 180 degrees between opposing pages. Meanwhile if the book is held in a user's lap, the covers may have a relative angle of 165 degrees, for example, which can be used to provide a baseline angle for augmenting the reveal of new pages as the angles of turning leaves change with respect to it.

Figure 3D:
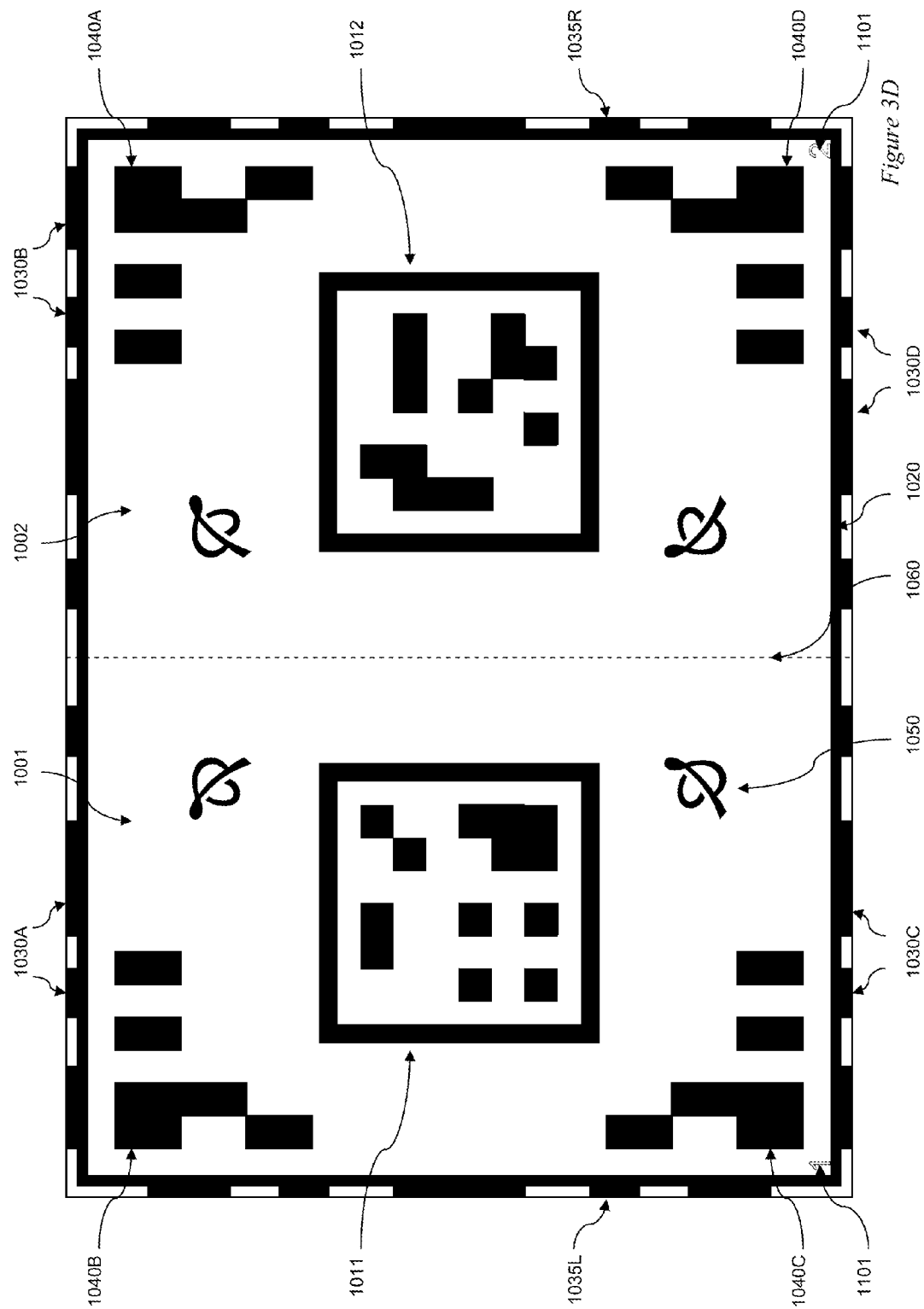
FIG. 3D is a schematic diagram of a book according to an embodiment of the present invention.

Turning now also to FIG. 3D, in areas of the pages of the book where neither fiduciary markers, non-alphanumeric patterns, or page borders are to be expected, then aesthetic graphical flourishes 1050, 1101 may be provided, such as abstract patterns, logos, alphanumeric characters and the like. Typically these will be printed in the same dark colour as the markers, but using much thinner lines, typically in the order of 1 mm or less. As a general rule of thumb, the thickness of the lines used in such aesthetic flourishes should be equivalent to less than one pixel width in an image of the book captured at a distance of 1 meter from the camera.

In an embodiment of the present invention, the colour scheme of the book comprises a background colour of the pages in a first colour and the printing on the page in a second colour, where the colour scheme is one selected from either
  i. a first colour of light blue and a second colour of dark blue; and
  ii. a first colour of light green and a second colour of dark green.

Within the background colour, variations in saturation can be used to generate low-contrast background images if desired. Hence more generally it will be understood that the first colour of light blue can represent a limited range of shades or saturations of light blue, as long as they provide adequate contrast to the printed dark blue of the various markings and patterns on the book.

The use of a light/dark blue or green colour scheme is to improve the ability to distinguish the book from skin tones, thereby enabling an augmented reality application to more accurately segregate book and skin pixels in the captured video image. This in turn allows an augmented reality application to more convincingly integrate user interactions with the book, for example layering augmentation layers so that the user's hand can appear to lie on top of the augmented book, but underneath or behind an virtual object that the user is pretending to hold.

In an embodiment of the present invention, the colour scheme for the outside covers of the book is the reverse of the colour scheme for the first and second colours of the pages of the book.

In other words, where the pages of the book use a light blue background and a dark blue print, the covers use a dark blue background and a light blue print. This allows for very simple disambiguation of the covers from the pages of the book without altering the mechanisms used to identify and track the book (fiduciary markers, non-alphanumeric markers, borders etc.). In particular, because there are only two covers to distinguish, optionally the fiduciary marker of the front cover can be qualitatively different to the marker on the back cover and also to the markers on the pages of the book, and may for example use a company logo or similar.

Although illustrative embodiments of the invention have been described in detail herein with reference to the accompanying drawings, it is to be understood that the invention is not limited to those precise embodiments, and that various changes and modifications cane be effected therein by one skilled in the art without departing from the scope and spirit of the invention as defined by the appended claims.

We claim:

1. A book for use with augmented reality applications, comprising:
  a plurality of stiff leaves, each side of which forms a page of the book;
  and on each of these pages:
  a respective fiduciary marker positioned substantially in an area of the page that is a predetermined distance from an outside edge of the page of the book in order to reduce a likelihood of a user's finger from occluding a portion of the fiduciary marker of the page, each fiduciary marker comprising a different respective asymmetric pattern configured to indicate a scale and orientation of the book to an augmented reality application, and to identify the page, and a non-alphanumeric pattern positioned closer to the outside edge of the page of the book than the fiduciary marker of that page, the outside edge being configured to be furthest from a user of the book when held in a particular orientation, the non-alphanumeric pattern on a respective page being configured to indicate, to the augmented reality application, one or more page specific augmentations for at least an opposing page pair comprising the respective page on which the non-alphanumeric pattern is positioned when used in conjunction with the scale and orientation of the book as indicated by a fiduciary marker on a different page to that of the respective non-alphanumeric pattern.

2. A book according to claim 1, in which a copy of the respective non-alphanumeric pattern is also positioned closer to the opposing outside edge of the page than the fiduciary marker, the copy being a mirror image reflected about a centre line between the two outside edges of the page.

3. A book according to claim 1, in which for opposing pages of the book, each page comprises one or two versions of an non-alphanumeric pattern that are mirror images of the or each non-alphanumeric pattern on the other page, reflected about a centre line coincident with a spine of the book.

4. A book according to claim 1, in which each respective non-alphanumeric pattern comprises a pattern made of rectangular blocks elongated in a direction parallel to a spine of the book.

5. A book according to claim 1, in which each respective non-alphanumeric pattern comprises a pattern having a predetermined ratio of blocks and gaps.

6. A book according to claim 1, in which no respective non-alphanumeric pattern comprises an unbroken line of blocks adjacent to an edge of the page.

7. A book according to claim 1, in which each respective non-alphanumeric pattern comprises a sub-region of the pattern, and in which the sub-region of the pattern encodes data indicating the respective page, or the opposing page pair comprising the respective page, on which the respective non-alphanumeric pattern is positioned.

8. A book according to claim 7, in which the non-alphanumeric pattern occupies an 'L' shaped region of the page between the fiduciary marker and an outer corner of the page, and the sub-region of the pattern encoding data indicating the respective page is located at the corner of the 'L' shaped region.

9. A book according to claim 1, in which the outside edges of each given page comprise a border marker configured to visually contrast the outside edges of the given page with respect to other areas of the page in order to allow the augmented reality program to detect an extent of the given page.

10. A book according to claim 1, in which each fiduciary marker is positioned so that the outer edges of the fiduciary marker are at least a predetermined distance from the outer edges of the page, the predetermined distance lying in the range 4 centimeters to 10 centimeters.

11. A book according to claim 1, in which each fiduciary marker is positioned in the middle of the page, but offset from the exact centre towards a spine of the book.

12. A book according to claim 1, comprising:
a cover having larger dimensions than the leaves of the book, and hence having extremities that extend beyond the outer edges of each page; and in which
the inside of the cover comprises a border marker configured to visually contrast the outside edges of the cover with respect to other areas of the cover in order to allow the augmented reality program to detect an extent of the given page along at least a first extremity.

13. A book according to claim 12, in which the cover has a predetermined thickness, and the border marker extends over an edge of the cover and across at least a predetermined proportion of the thickness of the cover.

14. A book according to claim 1, comprising a colour scheme in which a background colour of the pages is of a first colour and printing on the page is a second colour, and which the colour scheme is one selected from the list consisting of:
i. a first colour of blue and a second colour of blue, the first color of blue being a lighter version of blue than the second color of blue; and
ii. a first colour of green and a second colour of green, the first color of green being a lighter version of green than the second color of green.

15. A book according to claim 14, in which a colour scheme of the cover is a reverse of the colour scheme for the first and second colours of the pages of the book.

16. A book according to claim 1, wherein the predetermined distance is selected according to an average length of a thumb of a user amongst a target audience for the book.

* * * * *